United States Patent
Oh et al.

(10) Patent No.: US 11,958,377 B2
(45) Date of Patent: Apr. 16, 2024

(54) APPARATUS AND METHOD FOR DIAGNOSIS AND REPROGRAMMING SYSTEM USING WIRELESS CHARGING INTERFACE IN VEHICLE

(71) Applicants: HYUNDAI MOTOR COMPANY, Seoul (KR); Kia Corporation, Seoul (KR); YURA CORPORATION CO., LTD., Seongnam-si (KR)

(72) Inventors: In Sun Oh, Incheon (KR); Kwang Hae Ye, Seoul (KR); Ji Heon Kwon, Seoul (KR); Joon Hyuk Eom, Seongnam-si (KR); Jae Hwan Na, Yongin-si (KR); Yong Ho Kim, Seongnam-si (KR)

(73) Assignees: HYUNDAI MOTOR COMPANY, Seoul (KR); KIA CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 389 days.

(21) Appl. No.: 17/385,292

(22) Filed: Jul. 26, 2021

(65) Prior Publication Data
US 2022/0032808 A1  Feb. 3, 2022

(30) Foreign Application Priority Data
Aug. 3, 2020  (KR) .................. 10-2020-0096956

(51) Int. Cl.
*B60L 53/66* (2019.01)
*B60L 53/12* (2019.01)
(Continued)

(52) U.S. Cl.
CPC ............... *B60L 53/66* (2019.02); *B60L 53/12* (2019.02); *B60L 58/12* (2019.02); *G07C 5/0808* (2013.01)

(58) Field of Classification Search
CPC .......... B60L 53/66; B60L 53/12; B60L 58/12; B60L 53/65; B60L 2270/40; B60L 53/60;
(Continued)

(56) References Cited

U.S. PATENT DOCUMENTS

| | | | | |
|---|---|---|---|---|
| 2011/0215758 A1* | 9/2011 | Stahlin | ................... | H04B 3/542 320/109 |
| 2013/0179061 A1* | 7/2013 | Gadh | .................... | B60L 53/305 701/1 |

(Continued)

FOREIGN PATENT DOCUMENTS

| CN | 106100154 B | * | 2/2020 | .............. H02J 50/12 |
|---|---|---|---|---|
| EP | 2200147 A2 | * | 6/2010 | ............. G06Q 50/06 |

(Continued)

*Primary Examiner* — B M M Hannan
(74) *Attorney, Agent, or Firm* — MORGAN, LEWIS & BOCKIUS LLP

(57) ABSTRACT

A vehicle diagnosis system, an apparatus therefor, and a method therefore are provided. The vehicle diagnosis system includes a wireless charging station that transmits a message including information related to a supportable service type and information related to a vendor of a supportable vehicle and a vehicle that identifies the message and connect a diagnosis session for diagnosing and reprogramming the vehicle. The diagnosis session is performed when a connection for a wireless charging session of the vehicle is established.

18 Claims, 8 Drawing Sheets

(51) Int. Cl.
*B60L 58/12* (2019.01)
*G07C 5/08* (2006.01)

(58) Field of Classification Search
CPC ... B60L 3/0046; B60L 53/665; G07C 5/0808; G07C 5/008; Y02T 90/16; Y02T 10/70; Y02T 10/7072; Y02T 90/12; Y02T 90/14; Y02T 90/167; Y02T 90/10; Y04S 30/14; G05B 23/0262; G05B 2219/24065; G01S 1/04; H02J 50/10; B60Y 2200/91
USPC ........................................................ 701/296
See application file for complete search history.

(56) References Cited

U.S. PATENT DOCUMENTS

| | | | | |
|---|---|---|---|---|
| 2015/0095233 A1* | 4/2015 | Wild | ................ | G06Q 20/40 |
| | | | | 705/44 |
| 2015/0097525 A1* | 4/2015 | DeDona | ................ | B60L 1/006 |
| | | | | 320/109 |
| 2015/0224891 A1* | 8/2015 | Petrosian | ............ | B60L 3/0023 |
| | | | | 701/31.4 |
| 2015/0226572 A1* | 8/2015 | North | ................ | B60L 53/66 |
| | | | | 701/400 |
| 2016/0021193 A1* | 1/2016 | Fischer | ................ | H04L 43/10 |
| | | | | 709/224 |
| 2016/0113045 A1* | 4/2016 | Kang | ................ | H04W 12/50 |
| | | | | 370/338 |
| 2016/0259015 A1* | 9/2016 | Carlo | ................ | G01R 31/382 |
| 2016/0285299 A1* | 9/2016 | Amand | ................ | H02J 50/80 |
| 2016/0322853 A1* | 11/2016 | Porat | ................ | H04B 5/79 |
| 2017/0164414 A1* | 6/2017 | Cho | ................ | H04L 67/75 |
| 2017/0223750 A1* | 8/2017 | Turner | ................ | H02J 50/80 |
| 2017/0259673 A1* | 9/2017 | Rutyna | ................ | H04W 4/023 |
| 2017/0341519 A1* | 11/2017 | Ely | ................ | B60L 53/126 |
| 2018/0049077 A1* | 2/2018 | Mestanov | ............ | H04W 48/16 |
| 2018/0354383 A1* | 12/2018 | Namou | ................ | B60L 53/124 |
| 2019/0190321 A1* | 6/2019 | Wan | ................ | H04B 5/0037 |
| 2019/0255963 A1* | 8/2019 | Goei | ................ | B60L 53/68 |
| 2019/0294135 A1* | 9/2019 | Madrid | ................ | G05B 19/0426 |
| 2019/0351783 A1* | 11/2019 | Goei | ................ | B60L 53/63 |
| 2020/0006988 A1* | 1/2020 | Leabman | ................ | A61B 8/56 |
| 2020/0104778 A1* | 4/2020 | Tiderington | ........ | G06Q 30/0645 |
| 2021/0033414 A1* | 2/2021 | North | ................ | B60L 58/12 |
| 2021/0117177 A1* | 4/2021 | Noda | ................ | B60R 16/0231 |
| 2021/0195501 A1* | 6/2021 | Bittner | ................ | H04W 60/04 |
| 2022/0271363 A1* | 8/2022 | Burkell | ................ | B60L 58/27 |
| 2023/0322273 A1* | 10/2023 | Liu | ................ | B60W 30/10 |
| | | | | 701/23 |

FOREIGN PATENT DOCUMENTS

| | | | | |
|---|---|---|---|---|
| JP | 2020072501 A | * | 5/2020 | |
| JP | 2020129896 A | * | 8/2020 | |
| KR | 102006639 B1 | * | 8/2019 | |
| WO | WO-2016153701 A1 | * | 9/2016 | ............ H02J 7/025 |
| WO | WO-2021133416 A1 | * | 7/2021 | ............ B60K 37/00 |

* cited by examiner

APPARATUS AND METHOD FOR DIAGNOSIS AND REPROGRAMMING SYSTEM USING WIRELESS CHARGING INTERFACE IN VEHICLE

CROSS-REFERENCE TO RELATED APPLICATION

The present application claims priority to Korean Patent Application No. 10-2020-0096956, filed on Aug. 3, 2020, the entire contents of which is incorporated herein for all purposes by this reference.

BACKGROUND OF THE PRESENT INVENTION

Field of the Invention

The present invention relates to a vehicle diagnosis and reprogramming system, and more particularly, relates to a vehicle diagnosis device using a wireless charging interface of an electric vehicle and a method thereof.

Description of Related Art

Recently, with the development of wireless communication technology, as a 3rd generation (3G) system, a long term evolution (LTE) system, a 5th generation (5G) system, a new radio (NR) system, and an advanced communication system (network) have been used. Alternatively, as it is possible to transmit and receive more data in a specific communication area such as wireless-fidelity (Wi-Fi) communication, various types of services have been developed. Thus, an intelligent transportation system (ITS) of the vehicle has been developed, and communication between the vehicle to another vehicle or between the vehicle and an external infrastructure has been gradually developed in a form of various services.

Furthermore, there has been a growing trend to increase the number of electronic control units (ECUs) in the vehicle due to service requests of consumers and added functions. Each ECU is configured with hardware and software to provide a function suitable for a use purpose. Identifying a failure diagnosis code of each ECU and correcting software are performed by an on board diagnostic (OBD). ECU diagnosis and reprogramming through the OBD result in inconvenience where an engineer may directly connect a diagnosis device to the vehicle in a garage or a car-making facility.

Thus, there is a demand for a more efficient method for identifying a failure diagnosis code of the vehicle and reprogramming the vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle diagnosis device using a wireless charging interface, a method thereof, and a system thereof.

Various aspects of the present invention provide a diagnosis device configured for diagnosing a vehicle when a charging protocol session of the vehicle, a method thereof, and a system thereof.

Various aspects of the present invention provide a vehicle device configured for transmitting and receiving a message for diagnosis and reprogramming upon wireless charging, a method thereof, and a system thereof.

Various aspects of the present invention provide an apparatus of selectively diagnosing a vehicle with regard to a battery state of charge (SOC), a method thereof, and a system thereof.

Various aspects of the present invention provide an apparatus and a method for collecting vehicle information during wireless charging and performing a diagnosis and reprogramming service optimized for a vehicle.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, a vehicle diagnosis device may include a wireless charging station that transmits a message including information related to a supportable service type and information related to a vendor of a supportable vehicle and a vehicle that identifies the message and connects a diagnosis session for diagnosing and reprogramming the vehicle. The diagnosis session may be performed when a connection for a wireless charging session of the vehicle is established.

In various exemplary embodiments of the present invention, the wireless charging station may include information related to diagnosis or information related to reprogramming, the information being the information related to the supportable service type, in a station function type field and may include the information related to the vendor of the supportable vehicle in a vehicle vendor type field. The information may be transmitted to the vehicle by a vendor specific elements (VSE) beacon message.

In various exemplary embodiments of the present invention, the vehicle may identify the VSE beacon message to determine whether the wireless charging station supports a service for diagnosing and reprogramming the vehicle.

In various exemplary embodiments of the present invention, the vehicle may identify the VSE beacon message and may update the wireless charging station to an access point (AP) configured for supporting a service for diagnosing and reprogramming the vehicle.

In various exemplary embodiments of the present invention, the vehicle may be connected to only a charging protocol session for the vehicle, upon determining that supporting the service for diagnosing and reprogramming the vehicle is impossible.

In various exemplary embodiments of the present invention, the vehicle may identify that charging of the vehicle starts, may collect vehicle information related to the vehicle, may perform a vehicle diagnosis service, and may transmit the collected vehicle information and a result of performing the vehicle diagnosis service to the wireless charging station.

In various exemplary embodiments of the present invention, the wireless charging station may identify the collected vehicle information and the result of performing the vehicle diagnosis service, the collected vehicle information and the result being transmitted from the vehicle, to determine whether the vehicle is required to be reprogramed.

In various exemplary embodiments of the present invention, the wireless charging station may determine a battery state of charge (SOC) for the reprogramming to determine whether the vehicle is required to be reprogramed.

In various exemplary embodiments of the present invention, the vehicle may receive reprogramming request information and a reprogramming request file for the vehicle from the wireless charging station and may complete the reprogramming with regard to reprogramming approval of a user.

In various exemplary embodiments of the present invention, the vehicle may transmit a response message with the result of reprogramming the vehicle to the wireless charging station.

According to various aspects of the present invention, a vehicle diagnosis method may include transmitting a message including information related to a supportable service type and information related to a vendor of a supportable vehicle to a vehicle and identifying the message received by the vehicle and connecting a diagnosis session for diagnosing and reprogramming the vehicle. The diagnosis session may be performed when a connection for a wireless charging session of the vehicle is established.

In various exemplary embodiments of the present invention, the transmitting of the message may include information related to diagnosis or information related to reprogramming, the information being the information related to the supportable service type, in a station function type field and including the information related to the vendor of the supportable vehicle in a vehicle vendor type field. The information may be transmitted from a wireless charging station to the vehicle by a vendor specific elements (VSE) beacon message.

In various exemplary embodiments of the present invention, the vehicle diagnosis method may further include identifying, by the vehicle, the VSE beacon message to determine whether the wireless charging station supports a service for diagnosing and reprogramming the vehicle.

In various exemplary embodiments of the present invention, the vehicle diagnosis method may further include identifying, by the vehicle, the VSE beacon message and updating, by the vehicle, the wireless charging station to an access point (AP) configured for supporting the service for diagnosing and reprogramming the vehicle.

In various exemplary embodiments of the present invention, the vehicle diagnosis method may further include connecting, by the vehicle, only a charging protocol session for the vehicle, upon determining that supporting the service for diagnosing and reprogramming the vehicle is impossible.

In various exemplary embodiments of the present invention, the vehicle diagnosis method may further include identifying, by the vehicle, that charging of the vehicle starts, collecting, by the vehicle, vehicle information related to the vehicle, performing, by the vehicle, a vehicle diagnosis service, and transmitting, by the vehicle, the collected vehicle information and a result of performing the vehicle diagnosis service to the wireless charging station.

In various exemplary embodiments of the present invention, the vehicle diagnosis method may further include identifying, by the wireless charging station, the collected vehicle information and the result of performing the vehicle diagnosis service, the collected vehicle information and the result being transmitted from the vehicle, to determine whether the vehicle is required to be reprogramed.

In various exemplary embodiments of the present invention, the vehicle diagnosis method may further include determining, by the wireless charging station, a battery state of charge (SOC) for the reprogramming to determine whether the vehicle is required to be reprogramed.

In various exemplary embodiments of the present invention, the vehicle diagnosis method may further include receiving, by the vehicle, reprogramming request information and a reprogramming request file for the vehicle from the wireless charging station and completing, by the vehicle, the reprogramming with regard to reprogramming approval of a user.

In various exemplary embodiments of the present invention, the vehicle diagnosis method may further include transmitting, by the vehicle, a response message with the result of reprogramming the vehicle to the wireless charging station.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
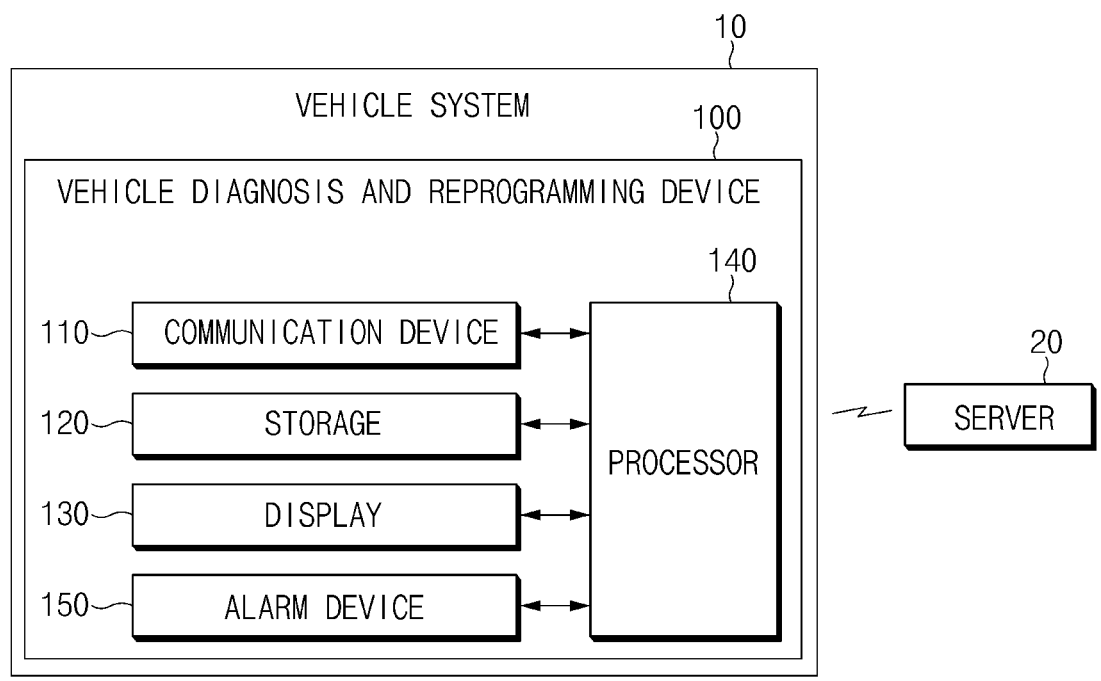
FIG. 1 is a block diagram illustrating a configuration of a vehicle diagnosis and reprogramming system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Recently, with the development of wireless communication technology, a vehicle diagnosis and reprogramming system according to various exemplary embodiments of the present invention has used a 3rd generation (3G) system, a long term evolution (LTE) system, a 5th generation (5G) system, a new radio (NR) system, and an advanced communication system (network). Alternatively, as it is possible to transmit and receive more data in a specific communication area such as wireless-fidelity (Wi-Fi) communication, the vehicle diagnosis and reprogramming system according to various exemplary embodiments of the present invention has been developed in a form of various types of services.

Various exemplary embodiments of the present invention is directed to providing a diagnosis device using a wireless charging interface of an electric vehicle and a system thereof, and to provide an apparatus of receiving a variety of information related to the vehicle through an interface connected for wireless charging control in an electric vehicle charging station and providing vehicle-customized diagnosis and reprogramming based on the information and a system thereof.

Hereinafter, embodiments of the present invention will be described in detail with reference to FIGS. 1 to 6.

FIG. 1 is a block diagram illustrating a configuration of a vehicle diagnosis and reprogramming system according to various exemplary embodiments of the present invention.

Referring to FIG. 1, a vehicle diagnosis and reprogramming device 100 according to various exemplary embodiments of the present invention may include a communication device 110, a storage 120, a display 130, a processor 140, and an alarm device 150.

The vehicle diagnosis and reprogramming device 100 according to various exemplary embodiments of the present invention may receive wireless update information related to data and software for diagnosing and reprogramming a vehicle from a server 20 outside the vehicle. The vehicle diagnosis and reprogramming device 100 may control to transmit the data for reprogramming based on at least one of a network load, a vehicle power state, a battery state of charge (SOC), or a time expected to transmit remaining ROM data. Furthermore, with regard to performance of a communication module, a processing speed of each controller, and the amount of data, the vehicle diagnosis and reprogramming device 100 may selectively reprogram a service depending on a battery state of charge of the vehicle and an approval request of a user.

Thus, when the vehicle enters a wireless charging station, a VSE message including diagnosis and reprogramming information for the vehicle may be advertised and diagnosis and reprogramming according to necessity may be performed when wireless charging. As an example, vehicle information may be information when the vehicle is lastly traveling or the like, which may include maintenance requirements, a time elapsed after last maintenance, function state information, vehicle diagnosis information, or the like.

As described above, due to user service requirements and communication and technology development in the vehicle, performance of the vehicle diagnosis and reprogramming device 100 may be recognized as an important service element when the user purchases the vehicle. Stably downloading data for the vehicle may be suitably considered in terms of ensuring stability such as battery discharging or communication network failure.

In detail, the communication device 110 may be a hardware device implemented with various electronic circuits to transmit and receive a signal through a wireless or wired connection. In various exemplary embodiments of the present invention, the communication device 110 may perform inter-vehicle communication through controller area network (CAN) communication, local interconnect network (LIN) communication, Ethernet communication, or the like. The communication device 110 may include various communication units, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit to communicate with the server 20 outside the vehicle. Herein, the CAN communication may be a network system for vehicle developed to provide digital serial communication between various measurement control equipment in the vehicle. A CAN-data bus may be used for data transmission and control between ECUs.

The communication device 110 according to various exemplary embodiments of the present invention may be loaded into the vehicle, or the communication device 110 may be configured in a form where a wireless communication terminal comes into contact with the communication device 110. As a result, the communication device 110 may perform vehicle-to-vehicle (V2V) communication and vehicle-to-infrastructure (V2I) communication, and may perform autonomous driving to a predetermined destination using a vehicle sensor and a driving control function, which are provided in the vehicle. Herein, the vehicle sensor may include at least one of a global positioning system (GPS) sensor, a gyro sensor, or an acceleration sensor. The communication device 110 For instance of the present invention may support a wireless access in vehicular environment (WAVE) communication technology or may support a communication technology of a long term evolution/new radio (LTE/NR) system based on 3rd generation partnership project (3GPP). For reference, WAVE communication is a technology of modifying IEEE 802.11a WLAN technology, which has features of using a dedicated band of 5.9 GHz, having a channel frequency bandwidth of 10 MHz, and having a maximum data rate of 27 Mbps, has a feature where wireless channel access is a planet carrier sense multiple access with collision avoidance (CSMA/CA) scheme, and has a feature of including IEEE 802.11p physical layer and 1609 communication stacks. Meanwhile, when supporting a 3GPP system, the communication device 110 may include LTE eV2X and 5G V2X communication technology, based on LTE V2X (Rel. 14).

The vehicle according to various exemplary embodiments of the present invention may include supporting vehicle-to-vehicle (V2V) communication referring to LTE/NR communication between vehicles, vehicle-to-pedestrian (V2P) communication referring to LTE/NR communication between a vehicle and a terminal carried by a person, and vehicle-to-infrastructure/network (V2I/N) communication referring to LTE/NR communication between a vehicle and a unit/network by the roadside and may have features of improving network scalability in communication by a mobile communication system. The vehicle according to various exemplary embodiments of the present invention may have an advantage where cell coverage is expanded through the network system. Furthermore, there is no limit to a multi-access technique of a wireless communication system to which various exemplary embodiments of the present invention is applied.

For example, various multi-access techniques such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA may be used. Furthermore, a time division duplex (TDD) mode where data is transmitted in a different time or a frequency division duplex (FDD) mode where data is transmitted using a different frequency may be used for uplink transmission or downlink transmission.

The storage 120 may store data downloaded for vehicle wireless update, which is received from the server 20 via the communication device 110. Thus, the storage 120 may store, manage, or update state/diagnosis information related to a host vehicle, location information related to the host vehicle, road information, information around the road, such as a bus stop, and information related to a road environment, via vehicle sensors included in the host vehicle and the server 20. Furthermore, the storage 120 may store destination information set by the user, existing discovered path information, or the like. Alternatively, the storage 120 may store or manage data for various input sensors for supporting autonomous driving and may store or manage data by a server which supports road information, communication information, and the like.

Furthermore, the storage 120 may store at least one of a network load, a vehicle power state, a battery state of charge, or a time expected to transmit remaining ROM data, which is determined by the processor 140. In the instant case, the storage 120 may store instructions according to each function. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may be controlled by the processor 140 to display a screen for being granted user authentication for wireless update of the vehicle. The display 130 may be implemented as a head-up display (HUD), a cluster, an audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, or a three-dimensional (3D) display. Some thereof may be implemented as transparent displays configured as a transparent type or a semi-transparent type to see the outside. Moreover, the display 130 may be implemented as a touch screen including a touch panel to be used as an input device other than an output device. According to various exemplary embodiments of the present invention, the display 130 may display reprogramming completion and version information to the user.

The processor 140 may be electrically connected to the communication device 110, the storage 120, the display 130, the alarm device 150, or the like and may electrically control the respective components. The processor 140 may be an electrical circuit which executes instructions of software and may perform a variety of data processing and determination described below.

The processor 140 may control whether to perform wireless update, with regard to a network load, a vehicle power state, a battery state of charge, a time expected to transmit remaining ROM data, or the like. For instance of the present invention, the processor 140 may identify information related to a service diagnosis type of a vendor specific elements (VSE) beacon message provided from a wireless charging station and information related to a vendor of a reprogrammable vehicle and may identify the amount of battery required upon reprogramming with regard to information related to current consumption of each controller in the vehicle to selectively perform reprogramming. Software remote reprogramming for a control in the vehicle may progress in a chargeable state where the vehicle stops.

Such a processor 140 may store and manage information related to an access point (AP) of the wireless charging station which transmits the VSE beacon message. Furthermore, the processor 140 may identify a battery state of charge (SOC) value of the vehicle and may selectively perform reprogramming with regard to stability for the reprogramming based on the battery SOC. The processor 140 according to various exemplary embodiments of the present invention may be connected to an external device based on a global positioning system (GPS), a telematics communication system, a Bluetooth communication system, a USB communication system, a Wi-Fi communication system, a WAVE communication system, and an LTE/5G communication system to perform communication processing for an entertainment service, a firmware update service, a remote start service, an eCall service, and an autonomous driving service. A service supported by the vehicle may include, for example, an autonomous driving service, a vehicle remote control service, an interactive service of a game or the like, a mass short-range audio/video service such as augmented reality (AR) or virtual reality (VR), or the like. Furthermore, there may be an update on infotainment software or map information related to the vehicle. Furthermore, there may be a service such as server-based speed recognition, smart watch interworking, or home-to-car. Alternatively, there may be a vehicle diagnosis control service.

Various exemplary embodiments of the present invention may provide an update information delivery method for diagnosis and reprogramming through a wireless charging interface, which may more efficiently provide a diagnosis and reprogramming operation using the wireless charging interface of the electric vehicle.

Figure 2:
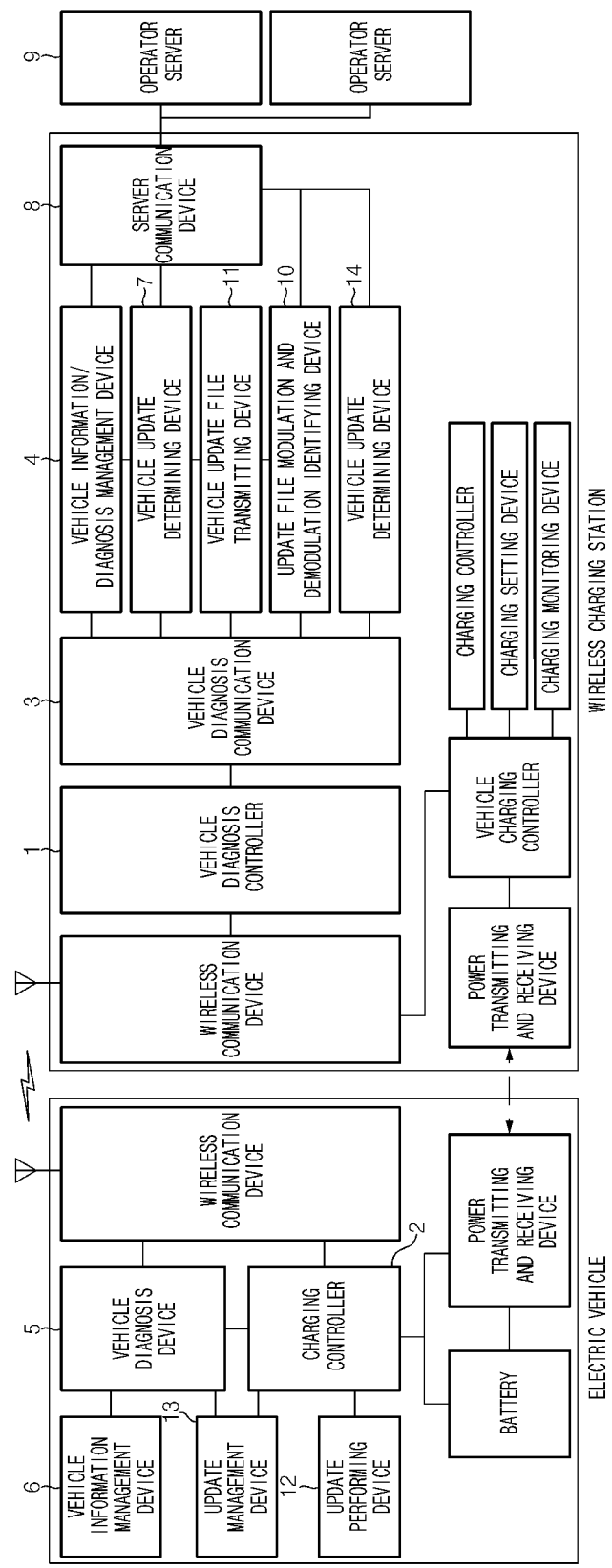
FIG. 2 is a block diagram schematically illustrating a structure of a vehicle diagnosis and reprogramming system using a wireless charging interface according to various exemplary embodiments of the present invention.

FIG. 2 is a block diagram schematically illustrating a structure of a vehicle diagnosis and reprogramming system using a wireless charging interface according to various exemplary embodiments of the present invention.

Referring to FIG. 2, the vehicle diagnosis and reprogramming system may roughly include a vehicle and a wireless charging station.

First of all, the vehicle may be an electric vehicle. The electric vehicle may include a wireless communication device, a vehicle diagnosis device 5, a charging controller 2, a vehicle information management device 6, an update management device 13, and an update performing device 12. The electric vehicle may further include a battery and a power transmitting and receiving device, which perform an operation under control of the charging controller 2.

In detail, the wireless communication device may perform a wireless communication function between the vehicle and the wireless charging station. The charging controller 2 may determine whether a diagnosis and reprogramming service is supported, based on vendor specific elements (VSE) information transmitted from an AP of the wireless charging station. When the function is supported, the charging controller 2 may additionally connect a diagnosis session independent of a charging session. The vehicle diagnosis device 5 may identify diagnosis service routing requested from the wireless charging station or may perform diagnosis in the vehicle itself, and may transmit the collected result and the diagnosed result to the wireless charging station. The vehicle information management device 6 may transmit the collected vehicle information to the vehicle diagnosis device 5. The update performing device 12 may reprogram the vehicle based on an update file transmitted from the wireless charging station and update approval information related to a user. The update management device 13 may determine whether the reprogramming is completed and may transmit the determined result to the wireless charging station. The power transmitting and receiving device may transmit and receive power in a wired/wireless manner between the vehicle and the wireless charging station. The battery may store the charged power.

Meanwhile, the wireless charging station may include a wireless communication device, a vehicle diagnosis controller 1, a vehicle information/diagnosis management device 4, a vehicle update determining device 7, a vehicle update file transmitting device 11, an update file modulation and demodulation identifying device 10, and a vehicle update management device 14. The wireless charging station may control a vehicle charging controller using information identified from the wireless communication device. The wireless charging station may operate a charging controller, a charging setting device, and a charging monitoring device under control of the vehicle charging controller.

In detail, the wireless communication device of the wireless communication device may control/perform a wireless communication function between the vehicle and the wireless charging station. The vehicle diagnosis controller 1 may advertise whether a wireless diagnosis and reprogramming service is supported, by a VSE beacon message and may manage a diagnosis session connection with the vehicle. When a diagnosis session is normally connected between the vehicle and the wireless charging station, the vehicle diagnosis communication device 3 may perform vehicle diagnosis communication based on a vehicle diagnosis protocol. The vehicle information/diagnosis management device 4 may collect vehicle information, such as a vehicle type, a vehicle vendor, vehicle unique information, or a vehicle controller version, and diagnosis information. The vehicle update determining device 7 may compare the collected vehicle information with information stored in a server to identify/determine/manage a controller needing update. The update file modulation and demodulation identifying device 10 may receive a vehicle update file, may check update file modulation and demodulation, and may identify validity. The vehicle update file transmitting device 11 may transmit an original update file to the vehicle or may divide the update file to transmit the divided files to the vehicle by the diagnosis session and the vehicle diagnosis protocol, and may determine whether the update file is normally delivered/transmitted. The vehicle update management device 14 may transmit the updated result to an operator server 9. A server communication device 8 may perform a communication function between the wireless charging station and the operator server, may select an operator server based on the vehicle collection information, and may transmit the vehicle collection information and the diagnosed result to the selected operator server.

A power transmitting and receiving device may transmit and receive power in a wired/wireless manner between the vehicle and the wireless charging station. The vehicle charging controller may detect a rechargeable state of the vehicle or may receive a power supply request from the vehicle, and may control charging of the vehicle. The charging controller may supply or block power to the vehicle connected to the wireless charging station. The charging setting device may set target charging capacity of the vehicle connected to the wireless charging station, the target amount of current, and the like. The charging monitoring device may monitor a charging line, which is in use, charging capacity, a battery state of charge (SOC) value of the vehicle, and the like.

When the vehicle and the wireless charging station is wirelessly connected to each other, the wireless communication device of the wireless charging station may advertise diagnosis and reprogramming service possible information by a VSE beacon message. Thus, the charging controller 2 of the vehicle may identify the VSE information and may additionally connect a diagnosis session independently of a charging session, when the wireless charging station includes an AP configured for performing diagnosis and reprogramming.

When the vehicle and the wireless charging station are normally connected to each other in conjunction with a vehicle information collection and diagnosis service, the vehicle diagnosis communication device 3 of the wireless charging station may perform diagnosis communication with the vehicle by the diagnosis session and the diagnosis protocol. The vehicle information/diagnosis management device 4 may provide a vehicle and diagnosis information request. Thus, the vehicle diagnosis device 5 of the vehicle may collect vehicle information, may perform diagnosis request routing or vehicle itself diagnosis, and may transmit the collected and diagnosed result to the wireless charging station. The vehicle information management device 6 may transmit the collected vehicle information to the vehicle diagnosis device 5. The server communication device 8 may transmit the collected and diagnosed result of the vehicle to the operator server 9.

When reprogramming (updating) the vehicle controller, the server communication device 8 of the wireless charging station may select an operator server based on the collected vehicle information. The vehicle update determining device 7 of the wireless charging station may determine whether an update is needed based on the collected vehicle information. Thus, the operator server 9 may transmit information related to a target controller determined that the update is needed and an update file for the controller.

Receiving it, the update file modulation and demodulation identifying device 10 of the wireless charging station may identify whether to modulate and demodulate the updated beacon message including a diagnosis and reprogramming service supported by the station, a vendor type, or the like. The VSE beacon message may have a message structure shown in FIG. 3B, which may include information like Table 1 below For instance of the present invention. The VSE beacon message advertised by the AP may be disposed with period information which varies with performance of the AP. It is possible for a period of the VSE beacon message to be verified through a beacon interval.

TABLE 1

| Field Name | Octet No | Field Size | Value | Description |
| --- | --- | --- | --- | --- |
| Element ID | 0 | 1 | 0xDD | VSE Fixed Value |
| Length | 1 | 1 | 0x07~0xFF | VSE Payload Length |
| OUI | 2-4 | 3 | — | Organization Unique Identifier |
| Station Function Type | 7 | 1 | 0x01~0xFF | Service Type supported by Charging Station<br>Bit 0: Diagnosis Function<br>Bit 1: Reprogramming<br>Bit 2~7: reserved |
| Vehicle Vendor Type | 8 | 1 | 0x01~0xFF | Vehicle Vendor Type configured for diagnosing and reprogramming vehicle in Charging Station<br>Bit 0: HMC<br>Bit 1: KMC<br>Bit 2: GM<br>Bit 3: SMC<br>Bit 4~7: reserved |
| Additional Information | 9~ | 0~248 | — | Additional Information (Optional) | file and may manage files. Thus, the vehicle update file transmitting device 11 of the wireless charging station may transmit an update file to the vehicle by the diagnosis session and the diagnosis protocol. In the instant case, a plurality of controllers may be reprogrammed by one update.

The update performing device 12 of the vehicle may reprogram a target controller of the vehicle based on the received update file and approval information related to the user. The update management device 13 may determine whether the reprogramming of the target controller is completed and may transmit the determined result to the wireless charging station. The vehicle update management device 14 may transmit the reprogrammed result to the operator server 9.

Various exemplary embodiments of the present invention may collect corresponding vehicle information during wireless charging of the vehicle to provide a diagnosis and reprogramming service suitable for the vehicle, thus providing a more efficient customer service. Furthermore, of the present invention an exemplary embodiment of the present invention may proceed with reprogramming when charging the vehicle, thus reducing a time and a cost for reprogramming.

Figure 3A:
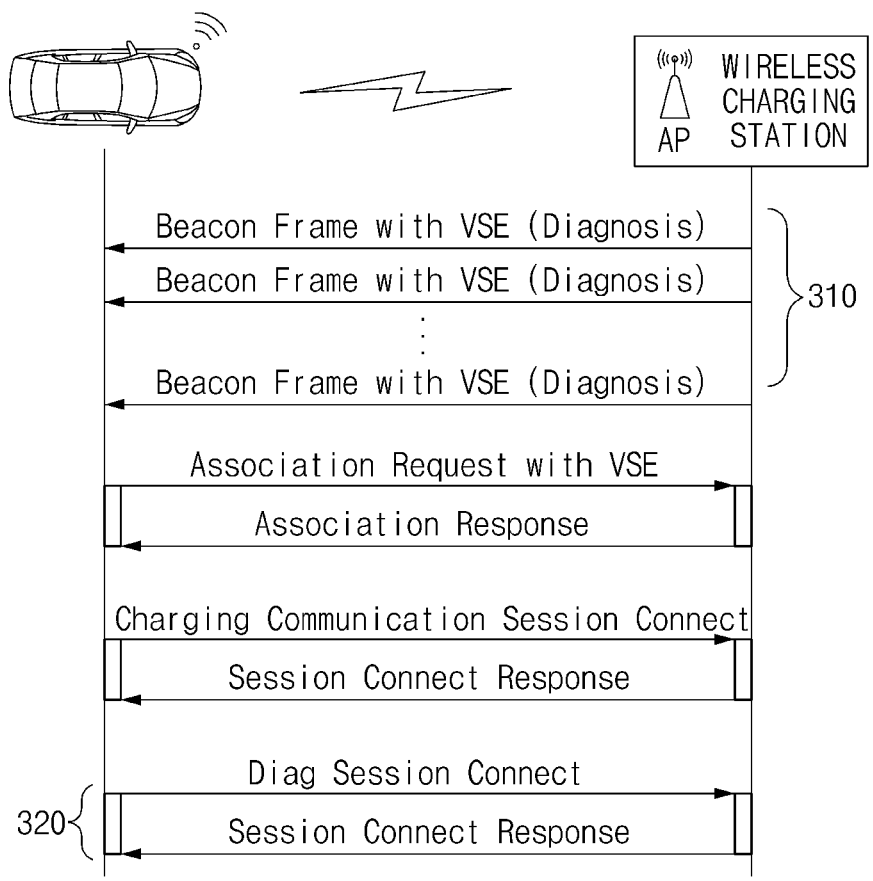
FIG. 3A and FIG. 3B are drawings schematically illustrating a message transmission and reception structure between vehicle diagnosis devices according to various exemplary embodiments of the present invention.
Figure 3B:
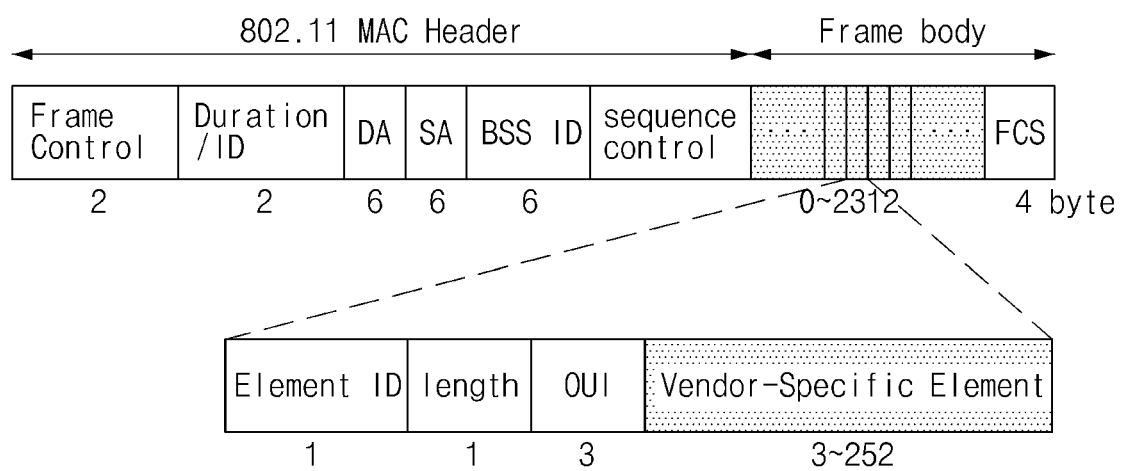

FIG. 3A and FIG. 3B are drawings schematically illustrating a message transmission and a reception structure between vehicle diagnosis systems according to various exemplary embodiments of the present invention. Herein, FIG. 3A includes a procedure of transmitting and receiving a message based on VSE when a vehicle and a wireless charging station are connected to each other, according to various exemplary embodiments of the present invention. FIG. 3B is a drawing schematically illustrating a structure of a VSE beacon message to which various exemplary embodiments of the present invention is applied.

Referring to FIG. 3A, in operation 310, an access point (AP) of a wireless charging station may provide a VSE As included in Table 1 above, identifying information related to the service type supported by the charging station and the vehicle vendor type configured for diagnosis and reprogramming the vehicle in the charging station, in operation 320, an electric vehicle may additionally connect a diagnosis (diag) session corresponding to the VSE information.

Figure 4:
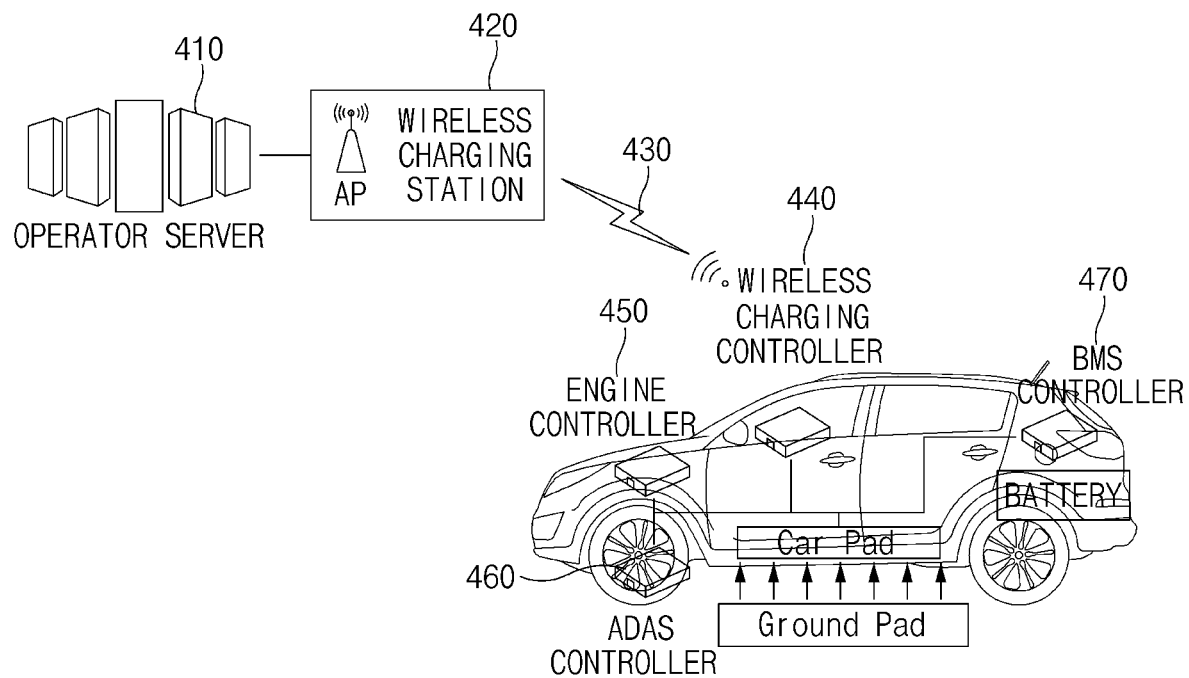
FIG. 4 is a drawing illustrating an operation upon communication between an electric vehicle and a wireless charging station according to various exemplary embodiments of the present invention.

FIG. 4 is a drawing illustrating an operation upon communication between an electric vehicle and a wireless charging station according to various exemplary embodiments of the present invention.

Referring to FIG. 4, upon reprogramming between the vehicle and the wireless charging station, an AP 420 may download update files of controllers to be reprogrammed, via an operator server 410. The wireless charging station may divide the update file and may transmit the divided update files to a wireless charging controller 440 of the vehicle. When completing the reception of the update files, the wireless charging controller 440 in the vehicle may proceed with reprogramming target controllers.

As an example, the present invention includes an engine controller 450, an advanced driver assistance system (ADAS) controller 460, a battery management system (BMS) controller 470, or the like as the target controller. The BMS controller 470 may be a system which controls a battery of an electric vehicle, which may identify charging/discharging of the battery of the electric vehicle, the remaining capacity of the battery, or the like. In detail, the BMS controller 470 may play a role in performing voltage balancing of each cell to adjust voltage by battery cell management and managing the battery such that the battery is not overloaded. In other words, the BMS controller 470 may play a role in increasing life and efficiency of the battery by cell balancing. Furthermore, the BMS controller 470 may include a current sensor and a temperature sensor to efficiently manage a battery cell. The BMS controller 470 may control charging/discharging of the battery by the current sensor and may diagnose an overcurrent/low current state of current to control a normal operation of the battery. The BMS controller 470 may measure a temperature of a battery module by the temperature sensor to determine overtemperature/low temperature. The BMS controller 470 may detect a current, a voltage, a temperature, or the like of the battery to predict a state of charge (SOC) and may identify the current remaining capacity of the battery. The SOC may be reset within a specified range and may be used to limit power such that the battery is not charged any longer. Limiting the power may prevent the battery from being overcharged or overdischarged. Furthermore, the BMS controller 470 may diagnose a failure of a battery system, may detect various failures, such as overvoltage/low voltage, battery cell failure, current sensor failure, temperature sensor failure, an open circuit/short circuit, cooling fan failure, communication abnormality, and relay fusion, and may transmit the diagnosed and detected result to the wireless charging controller 440.

Meanwhile, the ADAS may be a system for analyzing environments outside the vehicle and a driver state and performing view acquisition, screen display, guide, warning, control, or the like for driving and parking, which may play a key role in software development and integration for an autonomous driving and parking system. Thus, the ADAS controller 460 may update application software or the like for a high performance processor. In other words, the ADAS controller 460 may deliver sensor information related to a front view camera, a front radar, or the like provided in the vehicle and information related to acceleration/brake pedal manipulation or the like to the engine controller 450 and may control an operation based on an inter-vehicle distance, acceleration tendency, a response speed, or the like with regard to the variety of information. As an example, the ADAS controller 460 may provide a driving service with regard to a user driving style and may perform a function of maintaining a speed set by a driver or a setting distance from a front vehicle by a smart cruise control function.

Furthermore, the engine controller 450 may be an electronic control unit (ECU) which controls an engine, an automatic transmission, an automatic brake system (ABS), or the like of the vehicle in an optimal manner, which may control engine intake, fuel, and ignition timing, an engine RPM, variable valve timing, or the like of the vehicle to provide optimized driving performance, fuel efficiency, or the like of the driver. The engine controller (ECU) 450 may learn a driving habit of the driver and may provide a control value to suit it to control driving.

According to various exemplary embodiments of the present invention, after completing the reprogramming with regard to a situation of each controller, the wireless charging controller 440 may transmit the updated result to the operator server 410 via the wireless charging station (see reference numeral 430).

When performing a diagnosis between the vehicle and the wireless charging station, the wireless charging station may download a diagnosis service command from the operator server 410 based on the received vehicle information. The wireless charging station may transmit the diagnosis service command to the wireless charging controller 440. The wireless charging controller 440 may route the received command into the vehicle or may perform a diagnosis. The wireless charging controller 440 may transmit the diagnosed result to the wireless charging station.

Figure 5A:
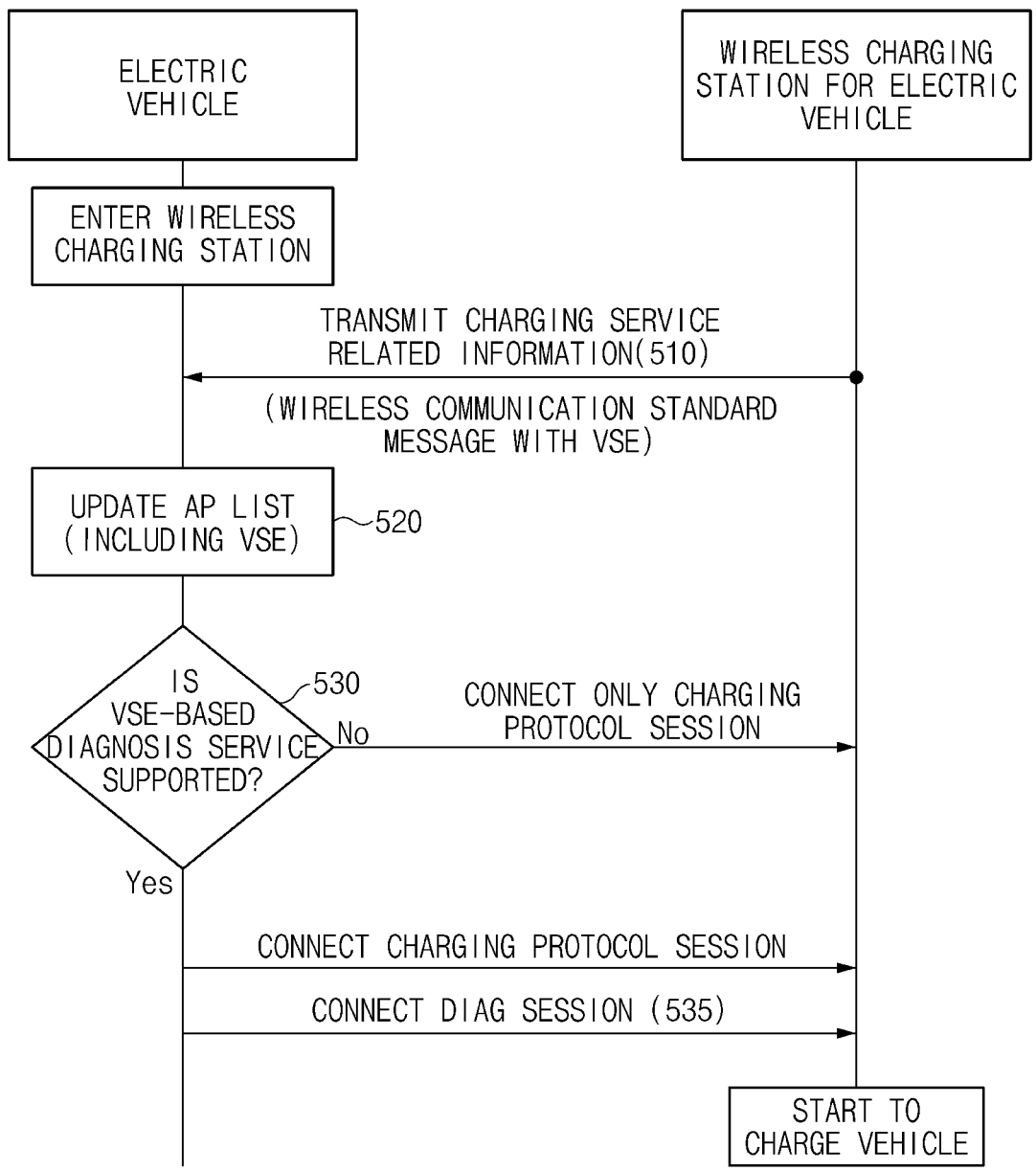
FIG. 5A and FIG. 5B are signal sequence diagrams illustrating a connection and communication procedure between an electric vehicle and a wireless charging station according to various exemplary embodiments of the present invention.
Figure 5B:
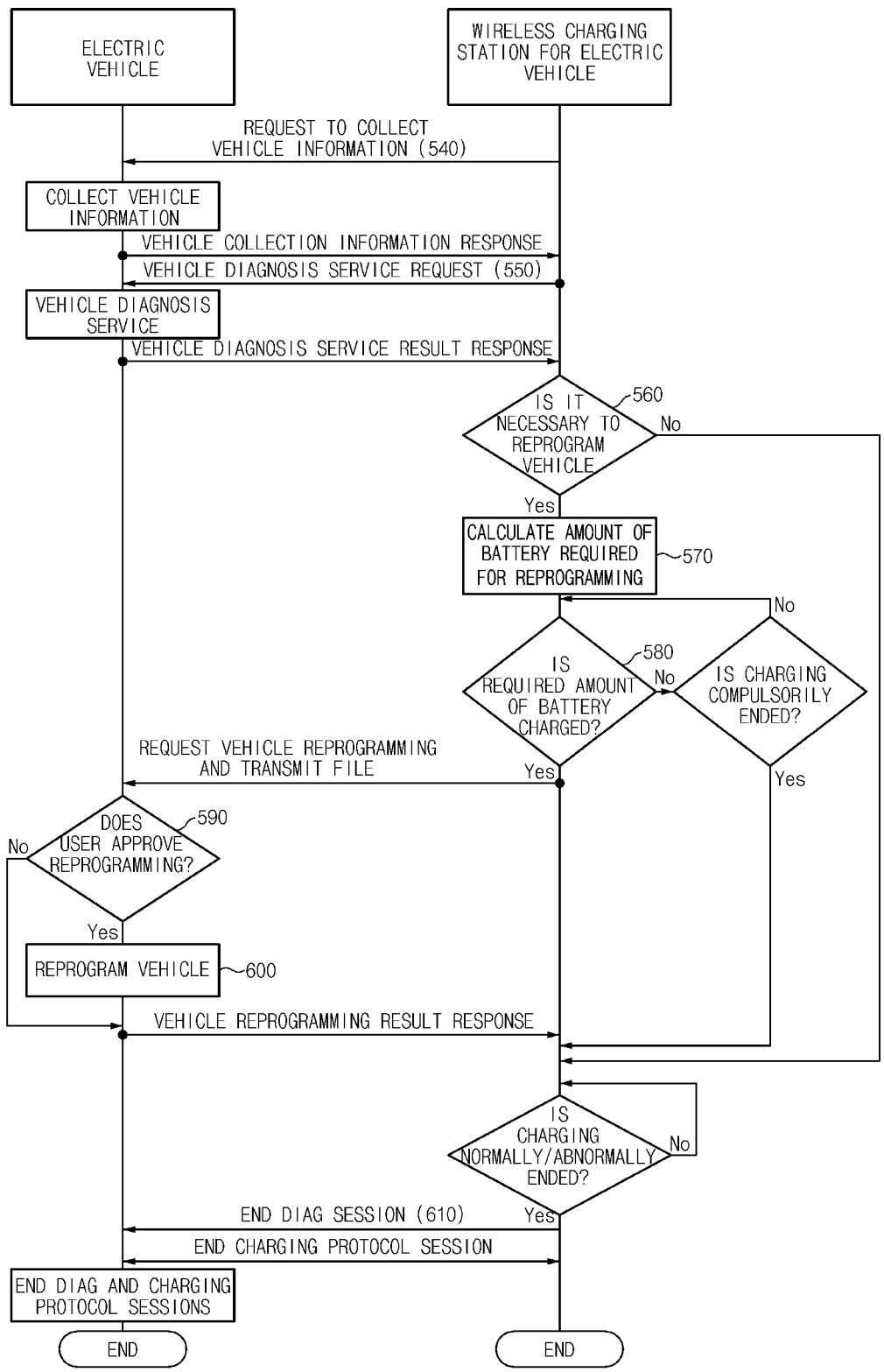

FIG. 5A and FIG. 5B are signal sequence diagrams illustrating a connection and communication procedure between an electric vehicle and a wireless charging station according to various exemplary embodiments of the present invention.

Referring to FIG. 5A and FIG. 5B, when a vehicle approaches a wireless charging station, the wireless charging station may transmit a VSE beacon message including charging service related information. The VSE beacon message may include information configured for supporting a diagnosis and reprogramming service for the vehicle through a wireless charging session. Thus, in operation 510, the wireless charging station may advertise that an AP which transmits the VSE beacon message is an AP configured for providing the diagnosis and reprogramming service. As an example, the wireless charging station may transmit a message including information related to a diagnosis and reprogramming service type supported by the wireless charging station and information related to a vendor about a vehicle configured for performing diagnosis and reprogramming.

Receiving the VSE message, in operation 520, the vehicle may update an AP list of the vehicle.

In operation 530, the vehicle may determine whether it is possible to support the diagnosis and reprogramming service based on the VSE information related to the wireless charging station. When it is possible to support the diagnosis and reprogramming service, in operation 535, the vehicle may additionally connect a diagnosis (diag) session. In the instant case, the charging protocol session may proceed when the diagnosis and reprogramming service. Meanwhile, when it is determined that there is no diagnosis and reprogramming service, only the charging protocol session may be connected.

In operation 540, according to the request to connect the diagnosis (diag) session, the wireless charging station may request the vehicle to collect vehicle information related to the vehicle. The vehicle may collect the vehicle information and may transmit the collected vehicle information in a form of a response message. Thus, in operation 550, the wireless charging station may provide the vehicle with a vehicle diagnosis service request to perform a necessary diagnosis service. The vehicle may perform the vehicle diagnosis service depending on the vehicle diagnosis service request of the wireless charging station and may transmit the result of performing the vehicle diagnosis service to the wireless charging station in a form of a response message.

In operation 560, the wireless charging station may identify the result to determine whether the vehicle is required to be reprogramed. Herein, the wireless charging station may communicate with an operator server based on the collected vehicle information to determine whether the vehicle is required to be reprogramed.

In the instant case, when it is determined that it is necessary to reprogram the vehicle, in operation 570, the wireless charging station may determine the amount of battery required for reprogramming. This is selectively applicable with regard to a battery state of charge (SOC) value of the vehicle and stability for reprogramming. As an example, when it is identified that the battery is in a low power state, for example, when a battery state of charge (SOC) is less than 50%, the wireless charging station may control reprogramming with regard to it. Thus, in operation 580, the wireless charging station may determine whether the required amount of battery is charged. In other words, the wireless charging station may determine whether the amount of battery required for reprogramming is changed.

In the instant case, when it is determined that the required amount of battery is sufficient, the wireless charging station may request a vehicle reprogramming and may transmit a vehicle reprogramming file to the vehicle. Receiving it, in operation 590, the vehicle may determine whether the user approves the reprogramming to proceed with the reprogramming. As the user inputs an acknowledgement to the reprogramming progress, in operation 600, the vehicle may perform vehicle reprogramming. In other words, the vehicle may perform the vehicle reprogramming based on the vehicle reprogramming file and user reprogramming approval information. After the reprogramming is completed, the vehicle may report the result to the wireless charging station in a form of a vehicle reprogramming result response message.

In the instant case, the wireless charging station may determine whether the required amount of battery is changed to identify a state where the charging of the vehicle is compulsorily ended. The wireless charging station may determine whether the charging of the vehicle is normally/abnormally ended with regard to the result of performing the reprogramming, the SOC, and the like. Thereafter, the wireless charging station may notify the vehicle that the charging protocol session and the diagnosis (diag) session are ended. Thus, the vehicle may end the charging protocol session and the diagnosis (diag) session. This may include ending the diagnosis (diag) session depending on a charging end condition such as charging completion or charging compulsory end of the user.

As described above, of the present invention an exemplary embodiment of the present invention may provide the diagnosis and update information delivery method through the wireless charging interface, which may perform the diagnosis and reprogramming operation using the wireless charging interface of the electric vehicle. In the instant case, of the present invention an exemplary embodiment of the present invention may enter a diagnosis session by means a VSE message, using the wireless charging interface between the vehicle and the wireless charging station. The VSE message may include information related to a supporting service type or a supportable vendor. In the instant case, of the present invention an exemplary embodiment of the present invention may determine whether reprogramming is performed based on information related to the battery state of charge (SOC) value of the electric vehicle, thus ensuring stability upon the reprogramming.

Figure 6:
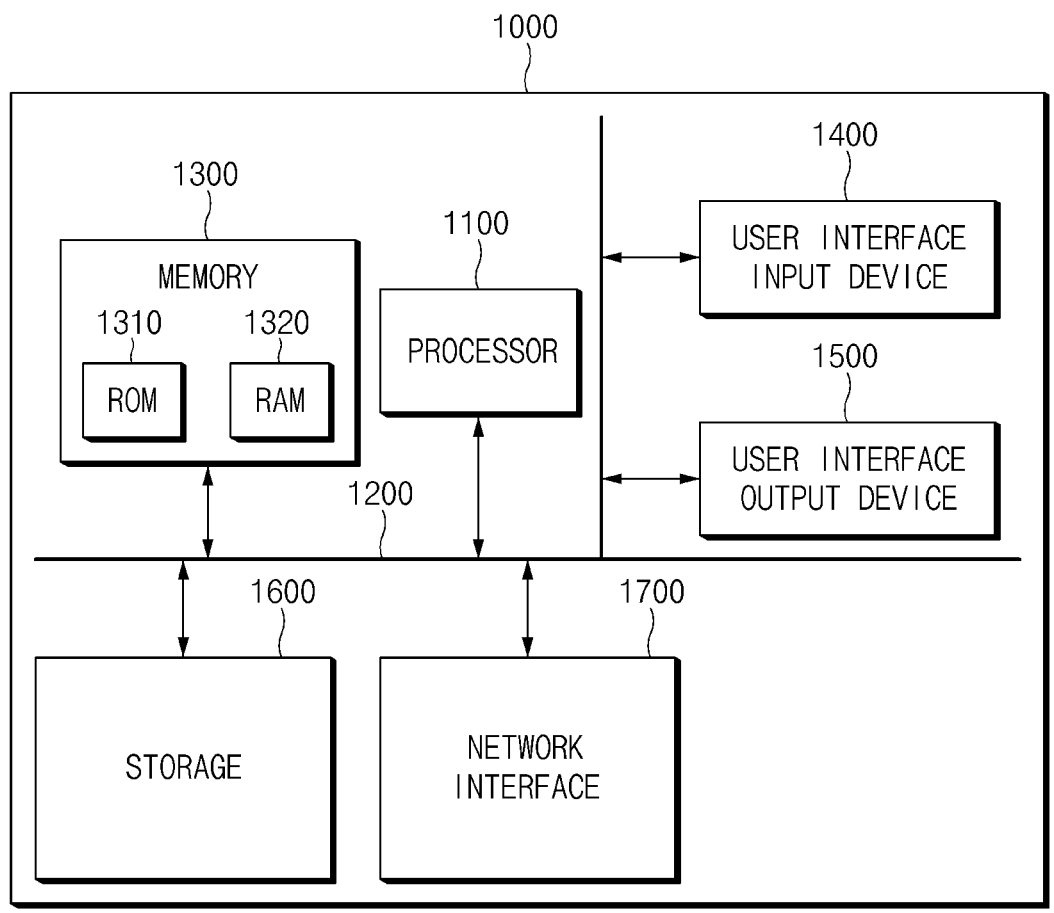
FIG. 6 is a block diagram illustrating a computing system according to various exemplary embodiments of the present invention.

FIG. 6 is a block diagram illustrating a determining system according to various exemplary embodiments of the present invention.

Referring to FIG. 6, a determining system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Various exemplary embodiments of the present invention may propose the method for collecting vehicle information during wireless charging of the electric vehicle and performing a diagnosis and reprogramming service suitable for the vehicle, thus helping a customer to manage the vehicle and enhancing service satisfaction of the customer. Furthermore, of the present invention an exemplary embodiment of the present invention may proceed with reprogramming the vehicle at the same as the vehicle is charged, thus reducing a time and a cost for reprogramming a vehicle controller. Furthermore, of the present invention an exemplary embodiment of the present invention may proceed with diagnosing and reprogramming the vehicle using a wireless charging interface of the vehicle rather than a separate communication interface, thus saving costs and reducing a development period.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle diagnosis system, comprising:
a wireless charging station configured to transmit a vendor specific elements (VSE) beacon message including information related to a supportable service type and information related to a vendor of a supportable vehicle; and
a vehicle configured to identify the message and connect a diagnosis session for diagnosing and reprogramming the vehicle,
wherein the diagnosis session is performed when a connection for a wireless charging session of the vehicle is established, and
wherein the vehicle is configured to identify the VSE beacon message to determine whether the wireless charging station supports a service for diagnosing and reprogramming the vehicle.

2. The vehicle diagnosis system of claim 1,
wherein the VSE beacon massage include a station function type field containing the information related to the supportable service and a vehicle vendor type field containing the information related to the vendor of the supportable vehicle, and
wherein the information related to the supportable service type includes information related to the diagnosing or information related to the reprogramming.

3. The vehicle diagnosis system of claim 2, wherein the vehicle is configured to identify the VSE beacon message and to update the wireless charging station to an access point (AP) configured for supporting the service for diagnosing and reprogramming the vehicle.

4. The vehicle diagnosis system of claim 3, wherein the vehicle is connected to only a charging protocol session for the vehicle, upon determining that the supporting the service for diagnosing and reprogramming the vehicle is impossible.

5. The vehicle diagnosis system of claim 3, wherein the vehicle is configured to identify that charging of the vehicle starts, to collect vehicle information related to the vehicle, to perform a vehicle diagnosis service, and to transmit the collected vehicle information and a result of performing the vehicle diagnosis service to the wireless charging station.

6. The vehicle diagnosis system of claim 5, wherein the wireless charging station is configured to identify the collected vehicle information and the result of performing the vehicle diagnosis service, the collected vehicle information and the result being transmitted from the vehicle, to determine whether the vehicle is required to be reprogramed.

7. The vehicle diagnosis system of claim 6, wherein the wireless charging station is configured to determine a battery state of charge (SOC) for the reprogramming to determine whether the vehicle is required to be reprogramed.

8. The vehicle diagnosis system of claim 5, wherein the vehicle is configured to receive reprogramming request information and a reprogramming request file for the vehicle from the wireless charging station and to complete the reprogramming with regard to reprogramming approval of a user.

9. The vehicle diagnosis system of claim 8, wherein the vehicle is configured to transmit a response message with the result of reprogramming the vehicle to the wireless charging station.

10. A vehicle diagnosis method, comprising:
transmitting a vendor specific elements (VSE) beacon message including information related to a supportable service type and information related to a vendor of a supportable vehicle to a vehicle;
identifying the VSE beacon message received by the vehicle and connecting a diagnosis session for diagnosing and reprogramming the vehicle; and
determining, by the vehicle, whether a wireless charging station supports a service for diagnosing and reprogramming the vehicle based on the VSE beacon message,
wherein the diagnosis session is performed when a connection for a wireless charging session of the vehicle is established.

11. The vehicle diagnosis method of claim 10,
wherein the VSE beacon massage include a station function type field containing the information related to the supportable service and a vehicle vendor type field containing the information related to the vendor of the supportable vehicle, and
wherein the information related to the supportable service type includes information related to the diagnosing or information related to the reprogramming.

12. The vehicle diagnosis method of claim 11, further including:
identifying, by the vehicle, the VSE beacon message and updating, by the vehicle, the wireless charging station to an access point (AP) configured for supporting the service for diagnosing and reprogramming the vehicle.

13. The vehicle diagnosis method of claim 12, further including:
connecting, by the vehicle, only a charging protocol session for the vehicle, upon determining that the supporting the service for diagnosing and reprogramming the vehicle is impossible.

14. The vehicle diagnosis method of claim 12, further including:
identifying, by the vehicle, that charging of the vehicle starts; and
collecting, by the vehicle, vehicle information related to the vehicle, performing, by the vehicle, a vehicle diagnosis service, and transmitting, by the vehicle, the collected vehicle information and a result of performing the vehicle diagnosis service to the wireless charging station.

15. The vehicle diagnosis method of claim 14, further including:
identifying, by the wireless charging station, the collected vehicle information and the result of performing the vehicle diagnosis service, the collected vehicle information and the result being transmitted from the vehicle, to determine whether the vehicle is required to be reprogramed.

16. The vehicle diagnosis method of claim 15, further including:
determining, by the wireless charging station, a battery state of charge (SOC) for the reprogramming to determine whether the vehicle is required to be reprogramed.

17. The vehicle diagnosis method of claim 14, further including:
receiving, by the vehicle, reprogramming request information and a reprogramming request file for the vehicle from the wireless charging station and
completing, by the vehicle, the reprogramming with regard to reprogramming approval of a user.

18. The vehicle diagnosis method of claim 17, further including:
  transmitting, by the vehicle, a response message with the result of reprogramming the vehicle to the wireless charging station.

* * * * *